W. W. SLOANE.
RECEPTACLE CLOSURE.
APPLICATION FILED DEC. 4, 1919.
1,346,853.
Patented July 20, 1920.
2 SHEETS—SHEET 2.
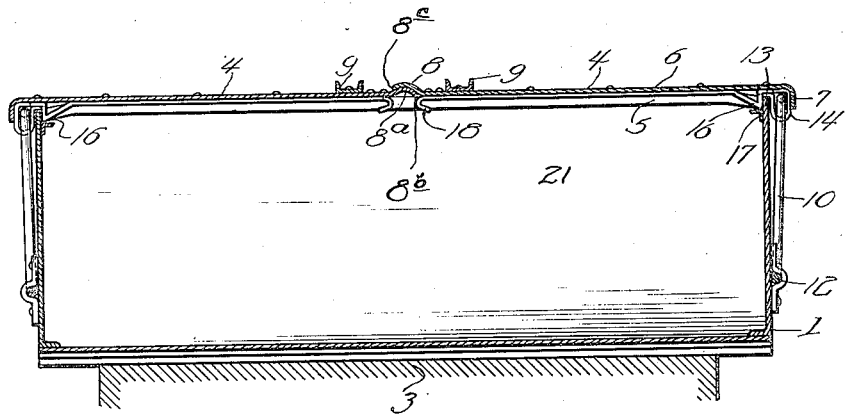
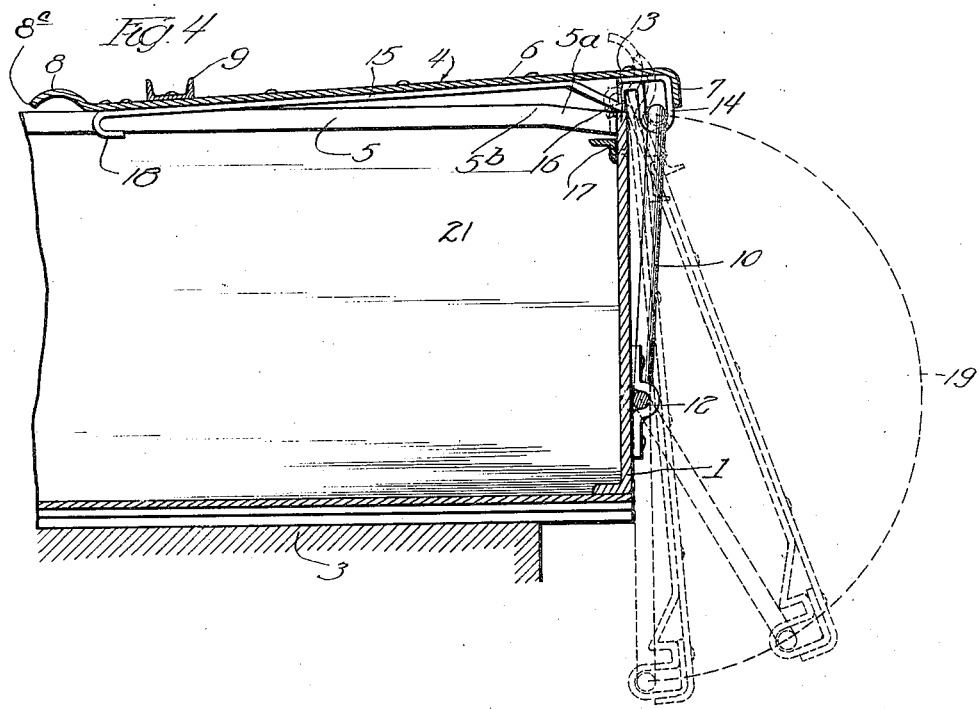
Inventor
William W. Sloane
Clarence F. Poole Atty.

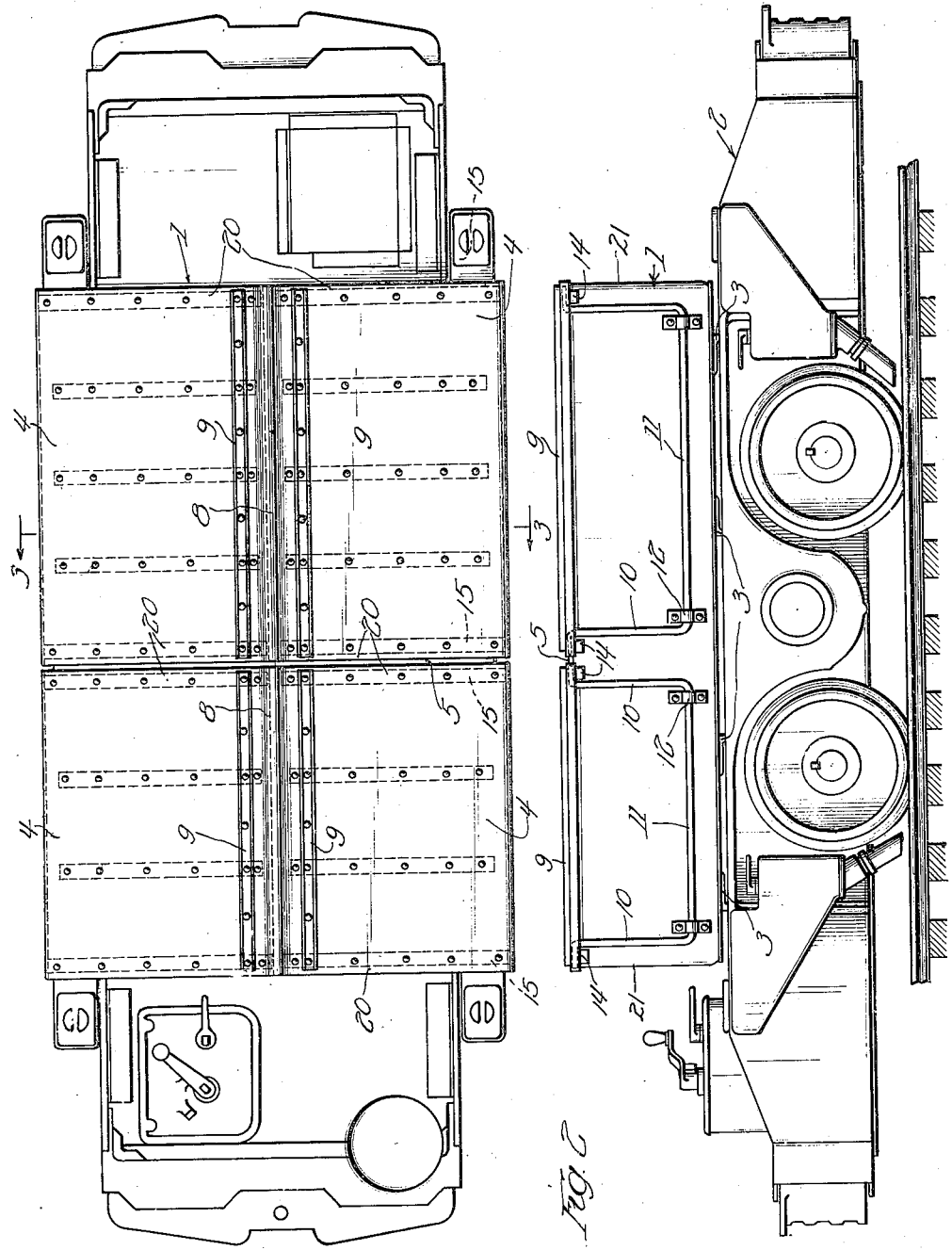

UNITED STATES PATENT OFFICE.

WILLIAM W. SLOANE, OF CHICAGO, ILLINOIS, ASSIGNOR TO GOODMAN MANUFACTURING COMPANY, OF CHICAGO, ILLINOIS, A CORPORATION OF ILLINOIS.

RECEPTACLE-CLOSURE.

1,346,853.  Specification of Letters Patent.  Patented July 20, 1920.

Application filed December 4, 1919. Serial No. 342,389.

*To all whom it may concern:*

Be it known that I, WILLIAM W. SLOANE, a citizen of the United States, residing at Chicago, in the county of Cook and State of Illinois, have invented an Improvement in Receptacle-Closures, of which the following is a specification.

This invention relates to improvements in receptacle closures, which are particularly adapted for use on storage battery locomotives, although not necessarily restricted to this use.

The object of this invention is to provide a receptacle cover which is simple in construction, is easily manipulated and which requires a minimum clearance when removed from, and replaced on, the receptacle.

Other objects of the invention will appear as the description proceeds.

The invention consists in the construction, combination, location and arrangement of parts, as will be more fully hereinafter set forth, in connection with the accompanying drawings, and more particularly defined in the appended claims.

Referring to the accompanying drawings, Figure 1 is a top plan view of a storage battery locomotive showing the application thereto of a battery box and a plurality of covers therefor, embodying the principles of my invention. Fig. 2 is a side view of the locomotive shown in Fig. 1. Fig. 3 is a transverse section of the battery box taken on line 3—3 of Fig. 1, showing details of the battery box and a pair of covers therefor, with said covers in fully closed position. Fig. 4 is an enlarged detailed cross section of one-half of the battery box, showing one cover section in partially and fully opened positions.

In the embodiment of my invention illustrated in the drawings, a battery box 1, is mounted on a locomotive body 2, by means of suitable supports 3, 3. Said battery box is preferably constructed with a single compartment adapted to receive the battery cells arranged in rows, in the usual manner.

A removable top for the battery box constructed in accordance with my invention, consists of a plurality of cover portions or units 4, 4, preferably arranged in pairs, each unit extending inwardly from a side margin of the box to the center line, and meeting the opposite unit to form a continuous closure for the battery compartment. In the construction illustrated, the top comprises two of such pairs of units. The number and arrangement of units may be varied as desired, it being preferable, however, to have each unit made as large as possible, consistent with ease of manipulation, so as to expose the maximum area of the box in one operation of opening the cover. When more than one pair of cover units are employed, a transverse cross-bar 5, is provided to support the adjacent lateral edges of the cover units.

Each cover unit comprises a body 6, preferably constructed of sheet metal, having a downwardly extending flange 7 at its outer margin, and a curved ridge or rib portion 8, along its inner margin. The ridge portion 8, of one cover is formed with a larger radius than the similarly disposed ridge $8^a$, so that the former overlaps the latter and forms therewith a weather-proof connection. (See Fig. 3.) The lateral edge of $8^c$, of the ridged portion $8^a$, is slightly lower than the lateral edge $8^d$, of the ridged portion 8. As will hereinafter more fully appear, the construction of the cover units is such that the meeting edges $8^b$, and $8^c$, approach each other in sliding relation, so that the cover units will always assume their respective positions shown in Fig. 3, with the ridged portion 8 superposed on the ridged portion $8^a$, when either unit is brought to closed position against the other.

A reinforcing strip 9 extends parallel and adjacent to the inner margin of each cover unit.

Each cover unit 4 is connected to the battery box by a double hinge construction whereby the unit may be easily removed from, and replaced on, the box. The hinge construction comprises hinge links 10, 10, preferably arranged in pairs as shown in Fig. 2, rigidly connected to each other at their lower ends by a bar 11, hinged to the side of the battery box 3, by suitable eyes 12, 12, at a point substantially below the upper margin 13, of said box. The distance from the upper margin 13 of the box to the eyes 12, 12, is approximately one-half the transverse width of the unit 4. The hinge links 10, 10, are pivotally connected to said unit 4, in vertically elongated eyes 14, 14, preferably formed of a metal strip 15, attached to the underside of said cover unit. Said metal strip 15, is also provided with a downwardly extending portion 16, adjacent the outer margin of the cover unit, said portion 16 being adapted to form a catch to engage the inner wall of the battery box, and to hold the cover from lateral displacement when said cover unit is in closed position as shown in Fig. 3. An angle bar 17, is attached to the inner wall of the box, is provided to engage and support the projection 16, and to regulate the height of the cover unit 4. A hook 18, is formed on the end of the metal strip 15, adjacent the inner margin of the cover 4, for the purpose of engaging the margin 13, of the battery box when the cover is in fully opened position, as illustrated in dotted lines in Fig. 4.

The supporting edge of the cross-bar 5, and the corresponding edges of the end walls 21, 21, are preferably formed with inclined portions 5$^a$, 5$^a$, adjacent the edges 13, 13, of the side walls, as shown in Fig. 4.

The operation of the device is as follows: With the covers in closed position (Fig. 3) the meeting inner margins 8 and 8$^a$, are in overlapping relation, and the projections 16, 16, are engaged with the inner walls of the battery box, to retain the cover against lateral movement. In order to unlock the cover, the outer edge, or margin 7, of a cover unit may be raised so as to lift the projection 16, over the side wall 13, and out of locked position thereagainst, as indicated in full lines in Fig. 4. From this position the cover may be slid laterally, and as the link 10 follows an arc as indicated in Fig. 4, the cover becomes inclined upward and bears, successively, on the points 5$^b$, 5$^b$, on the end walls and cross bar 5; next, on the inclined faces 5$^a$, 5$^a$, and lastly, on the edge 13 of the side wall. It will be observed that the provision of the inclined faces 5$^a$, 5$^a$, thus serve to position the fulcrum near the center of the cover unit during the first part of its tipping movement, and thereby reduces the binding effect which would be objectionable, if the cover were fulcrumed directly on the edge 13 during the first part of its lateral movement. The cover unit then continues its downward movement until it assumes an inclined position shown in dotted lines, in which position the hook 18, comes into engagement with the edge 13, of the side wall, and retains the cover in upright position against the side of the box, as is indicated in dotted lines in Fig. 4. In replacing the cover, the operation is the reverse of the above, but it will be noted that the lower end or margin 7, of the cover must be swung outwardly to an inclined position, before the cover can be lifted upwardly to slide into closed position. The hinged construction serves to return the cover to its proper position on the box, with the lateral edges 20, 20, in contact with the end wall 21, and supporting cross-bar 5, respectively. The bar 11, rigidly connecting links 10, 10, is provided to actuate both links simultaneously, thereby aiding in maintaining the cover in proper alinement.

By means of the above described device, it will be seen that the cover may be easily removed and replaced with a small expenditure of manual power, owing to the arrangement whereby a large portion of the weight of the cover is continuously supported in sliding engagement with the walls of the box, and also is partially supported by the links 10, 10, in a plurality of positions of the latter while the cover is being removed from, and replaced on, the box, as for instance, in the inclined position indicated in dotted lines in Fig. 4. Another advantage is that afforded by the small amount of clearance required in opening and closing the battery box.

Another feature of this invention is the construction whereby the lateral edges of the cover are maintained in alinement with the supporting end walls and transverse cross-bar 5, in all positions of the cover. It will be seen that, without support of both lateral edges 20, 20, a portion of the cover may come in contact with the batteries contained in the battery box, and thereby cause injury to the batteries, particularly in case the cover is constructed of metal, when an accidental contact with the terminals will cause a short circuit of the batteries.

While I have shown and described a specified construction and embodiment of my invention, I desire it to be understood that many variations in construction would readily suggest themselves, and that my invention may be applied to many uses other than as a closure for battery boxes without departing from the spirit and scope of my invention.

Having described my invention, what I claim as new and desire to cover by Letters Patent is:

1. In combination with a receptacle, a cover adapted to have continuous sliding and supporting engagement on an upper edge of said receptacle, and a double hinged link connecting said cover to said receptacle at a point removed from the upper edge thereof.

2. In combination with a receptacle having a side wall, a cover, a double hinged link connecting said cover to said receptacle, said link affording said cover a continuous sliding and supporting engagement on an upper edge of said receptacle, and means on said cover for detachably engaging said upper edge of said wall.

3. In combination with a receptacle, a cover adapted to have continuous sliding and supporting engagement on an upper edge of said receptacle, and means connecting said receptacle and said cover, and adapted to partially support said cover in its opened and partially opened positions.

4. In combination with a receptacle, a cover adapted to have sliding and supporting engagement on said receptacle, means connecting said cover with said receptacle at a point removed from an upper edge thereof, and means for detachably engaging a portion of said cover with said edge when said cover is in opened position.

5. In combination with a receptacle having a side wall, a cover, means connecting said cover to said receptacle, said means affording said cover a sliding and supporting engagement on said receptacle, means on said cover for detachably engaging said wall when said cover is in closed position, and means on said cover for detachably engaging said wall when said cover is in open position.

6. In combination with a receptacle having a side wall, a cover adapted to have continuous sliding engagement on an upper edge of said wall, a plurality of links connecting one margin of said cover to said receptacle at a point removed from said upper edge, and means rigidly connecting said links together.

7. In combination with a receptacle having a side wall, a cover adapted to have sliding engagement on an upper edge of said wall, a link hinged at one end to a margin of said cover, and at the other end to said receptacle at a point removed from said upper edge thereof, and means on said cover independent of said link detachably engaging said upper edge when said cover is in open position.

8. In combination with a receptacle having a side wall, a cover adapted to have sliding and tilting engagement on an upper edge of said wall, a double hinged link connecting a margin of said cover with said receptacle at a point removed from said upper edge, and means associated with said link affording a limited relative movement between said cover margin and the point of connection with said receptacle, whereby said cover may slide laterally to said receptacle an appreciable distance before being tilted on said upper edge.

9. In a device of the class described in combination with a receptacle, a cover adapted to have continuous sliding and supporting engagement on said receptacle, a link hinged at one end to one margin of said cover, and at the other end to said receptacle at a point removed from the upper edge, and means coacting with said link for engaging said cover on said receptacle.

10. In a device of the class described in combination with a receptacle, a cover, a link hinged at one end to one margin of said cover, and at the other end to said receptacle at a point below an upper edge thereof, means adjacent said margin of said cover adapted to engage said upper edge of the receptacle, and means affording limited vertical movement of said cover.

11. In a device of the class described, in combination with a receptacle, a cover, a link hinged at one end to one margin of said cover, and at the other end to said receptacle at a point removed from an upper edge thereof, and means on said cover for engaging said upper edge when said cover is removed from said receptacle.

12. In a device of the class described, in combination with a receptacle, a cover, a link hinged at one end to the outer margin of said cover, and at the other end to said receptacle at a point removed from an upper edge thereof, means coacting with said link, for engaging said cover in closed position on said receptacle, comprising a projection on the under surface of said cover adapted to engage said upper edge of the receptacle, and means adjacent the inner margin of said cover for engaging said upper edge when the cover is removed from said receptacle.

13. In a device of the class described, a receptacle, a cover therefor, a metal strip attached to the under side of said cover, said strip having a hooked end adjacent one margin of said cover, and a looped portion adjacent the opposite margin of said cover, and a link having pivoted and sliding engagement in said looped portion, and hinged to said receptacle at a point removed from the upper edge thereof.

14. In a device of the class described, a receptacle, a cover therefor, a metal strip attached to the under side of said cover, said strip having a hooked end adjacent one margin of said cover, and a downwardly depending portion adjacent the opposite margin of said cover, a vertically elongated looped portion, and a link having pivoted engagement with said looped portion, and hinged to said receptacle at a point removed from the upper edge thereof.

15. In a device of the class described, a receptacle, a cover therefor, a plurality of metal strips attached to the under side of said cover, said strips having hooked ends adjacent one margin of said cover, and downwardly extending portions adjacent the opposite margin of said cover, vertically elongated looped portions adjacent said downwardly extending portions, a plurality of links having pivoted connection with said looped portions, said links being hinged to said receptacle at a point removed from the upper margin thereof, and means rigidly connecting said links together.

16. In combination with a receptacle having a side wall, a cover adapted to have sliding and tilting engagement on said side wall, a supporting member for said cover adjacent said side wall, and having a portion raised above an upper edge of said side wall, and a double hinged link connecting said cover to said receptacle at a point below the upper edge of said side wall.

17. In a device of the class described, a receptacle having a side wall, a cover, a link hinged at one end to a margin of said cover and at the other end to said receptacle at a point removed from an upper edge of said wall, and a supporting member for said cover extending inwardly from said wall, and having a portion thereof raised above said upper edge.

18. In a device of the class described, in combination with a receptacle, a cover, a link hinged at one end to one margin of said cover, and at the other end to said receptacle at a point removed from an upper edge thereof, a supporting member for said cover extending inwardly from said upper edge, having a portion raised above the same, and means for supporting the margin of said cover on said upper edge.

19. In a device of the class described, in combination with a receptacle, a cover, a link hinged at one end to one margin of said cover, and at the other end to said receptacle at a point removed from an upper edge thereof, a supporting member for said cover extending inwardly from said upper edge, and having a portion thereof raised above the same, a projection adjacent said margin of said cover, and a support for said projection.

20. In a device of the class described, in combination with a receptacle, a cover, a link hinged at one end to one margin of said cover, and at the other end to the exterior face of a side wall of said receptacle at a point below an upper edge thereof, a supporting member for said cover extending inwardly from said wall and having a portion raised above said upper edge, a projection on the under side of said cover adapted to engage the inner face of said wall, a support for said projection, and means affording limited vertical movement of said cover.

21. In a device of the class described, a receptacle, a cover, a link hinged at one end to a margin of said cover and at the other end to the exterior face of a side wall of said receptacle at a point removed from an upper edge thereof, and a pair of supporting members for the lateral edges of said cover extending inwardly from said wall, and having portions thereof raised above said upper edge.

22. In combination with a receptacle, a cover, and means connecting said cover to said receptacle at a point removed from an upper edge thereof, said means permitting said cover continuous sliding and supporting engagement on said upper edge of the receptacle.

23. In combination with a receptacle, a cover, and means connecting said cover to said receptacle at a point removed from an upper edge thereof, said means permitting said cover continuous sliding and supporting engagement on said upper edge of the receptacle, and affording support to said cover in a partially opened position.

24. In combination with a receptacle, a cover therefor, and means connecting said cover to said receptacle, said means permitting continuous sliding and supporting engagement between said cover and an upper edge of said receptacle during the removal and replacement of the cover, and affording additional support to said cover, when the cover is in partially opened position.

WILLIAM W. SLOANE